United States Patent
Speer

(10) Patent No.: US 7,353,865 B2
(45) Date of Patent: Apr. 8, 2008

(54) METHOD FOR CONTROLLING A VALVE FOR AN EXHAUST SYSTEM

(75) Inventor: Gregg Speer, Dachau (DE)

(73) Assignee: ArvinMeritor Technology, LLC, Troy, MI (US)

( * ) Notice: Subject to any disclaimer, the term of this patent is extended or adjusted under 35 U.S.C. 154(b) by 584 days.

(21) Appl. No.: 10/930,720

(22) Filed: Aug. 31, 2004

(65) Prior Publication Data

US 2005/0051322 A1 Mar. 10, 2005

Related U.S. Application Data

(60) Provisional application No. 60/500,587, filed on Sep. 5, 2003.

(51) Int. Cl.
G05D 16/00 (2006.01)
F01N 5/02 (2006.01)

(52) U.S. Cl. ............ 165/284; 165/281; 165/286; 165/297; 165/51

(58) Field of Classification Search ........ 165/281, 165/282, 283, 284, 285, 286, 296, 297, 51, 165/52; 123/556; 73/116, 117.2, 117.3; 60/274
See application file for complete search history.

(56) References Cited

U.S. PATENT DOCUMENTS

| | | | | |
|---|---|---|---|---|
| 4,593,749 A | * | 6/1986 | Schatz | 165/283 |
| 5,740,786 A | * | 4/1998 | Gartner | 123/556 |
| 5,894,834 A | * | 4/1999 | Kim | 165/297 |
| 6,151,891 A | * | 11/2000 | Bennett | 165/51 |
| 6,330,910 B1 | * | 12/2001 | Bennett | 165/51 |
| 6,971,377 B2 | * | 12/2005 | Moyer et al. | 165/51 |
| 7,174,777 B2 | * | 2/2007 | Fischer et al. | 73/116 |
| 7,181,906 B2 | * | 2/2007 | Dalla Betta et al. | 60/286 |

FOREIGN PATENT DOCUMENTS

| | | |
|---|---|---|
| CA | 2 273 698 A1 | 12/2000 |
| DE | 195 00 476 A1 | 7/1996 |
| GB | 2 301 177 A | 11/1996 |

OTHER PUBLICATIONS

European Search Report relating to Application No. EP 04 02 0841 completed Aug. 31, 2005.

* cited by examiner

*Primary Examiner*—Ljiljana Ciric
(74) *Attorney, Agent, or Firm*—Carlson, Gaskey & Olds

(57) ABSTRACT

An exhaust gas heat exchanger system of a combustion engine has a bypass duct and a heat exchanger duct with a heat exchanger. A valve is controlled by determining when heat is to be transferred from exhaust gas flowing through the exhaust system to the heat exchanger. When heat is to be transferred, the valve is switched into a first position in which all of the exhaust gas flows through the heat exchanger duct. A pressure drop across the heat exchanger system is monitored either directly or indirectly. If the pressure drop reaches a predefined limit, the valve is switched into an intermediate position, resulting in a smaller portion of the exhaust gas flowing through the heat exchanger duct than when the valve is in the first position and a remaining portion flowing through the bypass duct, thereby reducing the pressure drop across the heat exchanger system. If the pressure drop again reaches a predefined limit, the valve is switched into a second position, resulting in an even smaller portion of the exhaust gas flowing through the heat exchanger duct, thereby further reducing the pressure drop across the heat exchanger system.

11 Claims, 2 Drawing Sheets

METHOD FOR CONTROLLING A VALVE FOR AN EXHAUST SYSTEM

This Nonprovisional Patent Application claims priority to U.S. Provisional Patent Application No. 60/500,587 filed on Sep. 5, 2003.

BACKGROUND OF THE INVENTION

The invention relates to a method for controlling a valve for an exhaust system of a vehicle, and in particular a valve used for controlling the flow of exhaust gas through a heat exchanger.

A heat exchanger is part of auxiliary heating systems, which are increasingly used in vehicles having modern combustion engines with low fuel consumption. These combustion high efficiency engines produce, only a small amount of lost heat that is available for the heating system for the vehicle. This results in a reduced heating performance of the heating system, which may be uncomfortable to a vehicle's occupants. Accordingly, auxiliary heating systems have been developed that use a heat exchanger located in the exhaust system of the vehicle. The heat exchanger allows a gain of a certain portion of the heat of the exhaust gas, which is then available for heating the interior of the vehicle.

Auxiliary heating systems typically have an exhaust gas duct, in which the heat exchanger is located, and a bypass duct. By controlling a portion of the overall exhaust gas flowing through the heat exchanger duct, a desired heating characteristic of the auxiliary heating system can be obtained. To this end, a valve is provided, which is controlled depending on external parameters.

In general, a heat exchanger offers additional resistance to the exhaust gas flowing through the exhaust system, leading to a pressure drop. This pressure drop adds to the back pressure of the exhaust system, which in general is to be kept low to achieve good engine performance. Under some conditions, and in particular in cold weather conditions, the aim of providing better heating performance by directing the exhaust gas through the heat exchanger may result in a conflict with the aim of providing good engine performance by keeping the back pressure of the exhaust system low.

Therefore, there is a need for a method for controlling a valve in an exhaust system such that good heating performance is achieved, while at the same time ensuring that the pressure drop across the heat exchanger, and, accordingly, the back pressure of the exhaust system does not exceed given limits.

SUMMARY OF THE INVENTION

To this end, the invention provides a method for controlling a valve in an exhaust gas heat exchanger system of a combustion engine. The exhaust gas heat exchanger system has a bypass duct and a heat exchanger duct with a heat exchanger. The method comprises the steps of determining that heat is to be transferred from exhaust gas flowing through the exhaust system to the heat exchanger. Thereupon, the valve is switched into a first position in which all of the exhaust gas flows through the heat exchanger duct. A pressure drop across the exhaust gas heat exchanger system is monitored either directly or indirectly. If the pressure drop reaches a predefined limit, the valve is switched into an intermediate position, resulting in a first portion of the exhaust gas flowing through the heat exchanger duct and a remaining portion flowing through the bypass duct. Moving the valve to the intermediate position reduces the pressure drop across the exhaust gas heat exchanger system. If the pressure drop again reaches a predefined limit, the valve is switched into a second position, resulting in a second portion of the exhaust gas flowing through the heat exchanger duct. The second portion is smaller than the first portion, thereby further reducing the pressure drop across the heat exchanger system.

The invention is based on the recognition that, starting from a condition in which the entire exhaust gas flows through the heat exchanger, a significant reduction of the pressure drop is achieved by allowing just a small portion of the exhaust gas to flow through the bypass duct, without resulting in a notable reduction in heating performance of the auxiliary heating system. In other words, the pressure drop across the heat exchanger is more sensitive to a mass flow reduction than the heating performance of the auxiliary heating system. Based on this recognition, the invention is based on the idea of decreasing in steps the portion of the exhaust gas flowing through the heat exchanger.

Assuming that system requirements focus on the heating performance, the position of the valve of the exhaust gas heat exchanger system could be controlled continuously or by using a plurality of intermediate positions such that the pressure drop is kept below the predefined limit, thereby obtaining a maximum heating performance without adversely affecting engine performance. Assuming that system requirements focus on costs, the position of the valve could be changed between a few defined positions. In a preferred embodiment, only three positions of the valve are used. In this case, the second position corresponds to a position in which the heat exchanger is switched off and the entire exhaust gas flows through the bypass duct.

BRIEF DESCRIPTION OF DRAWINGS

The invention will hereinafter be described by means of a preferred embodiment which is shown in the enclosed drawings. In the drawings, FIG. 1 schematically shows a first example of an exhaust gas heat exchanger system.

DETAILED DESCRIPTION OF THE PREFERRED EMBODIMENT

Two embodiments of heat exchanger units employed in auxiliary heating systems are now described with reference to FIGS. 1 and 2. In both systems, the exhaust gas of a combustion engine (not depicted) enters in the direction of arrow P from the right side with respect to the drawings. The system has a heat exchanger duct 5 with a heat exchanger 7 for the exhaust gas, and a bypass duct 9. A valve 10 is used to control the flow of the exhaust gas through heat exchanger duct 5 and bypass duct 9.

Figure 1:
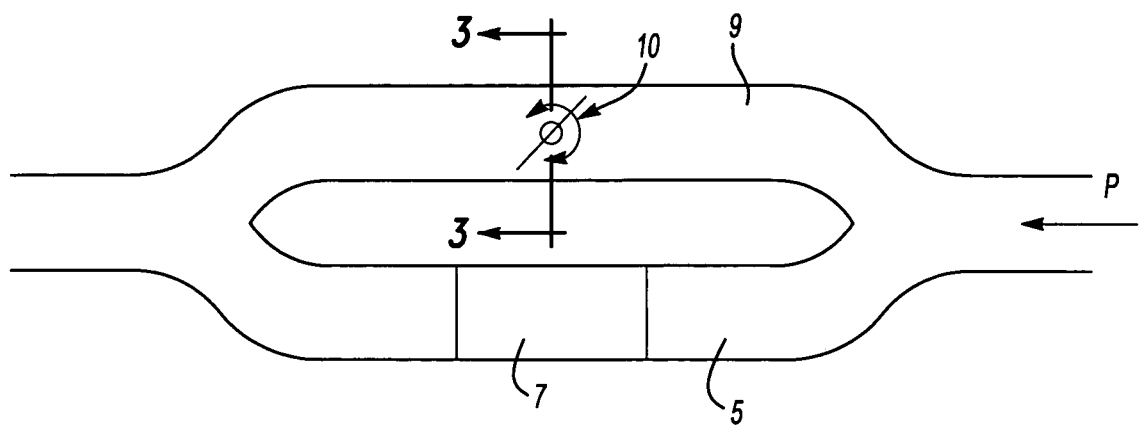

In the embodiment of FIG. 1, the proportion of the gas flow through the ducts is controlled by varying the flow resistance of bypass duct 9. When valve 10 is in a completely opened position, the flow resistance of bypass duct 9 is significantly less than the flow resistance of heat exchanger 7 in heat exchanger duct 5, resulting in almost no gas flow through the heat exchanger 7. When valve 10 is in a completely closed position, the gas flow through bypass duct 9 is blocked, and the gas flows completely through heat exchanger 7, apart from any small leakage flow past valve 10. Moving the position of the valve 10, to intermediate positions allows for any desired portion of the gas flow to be achieved through the ducts 5 and 9.

Figure 2:
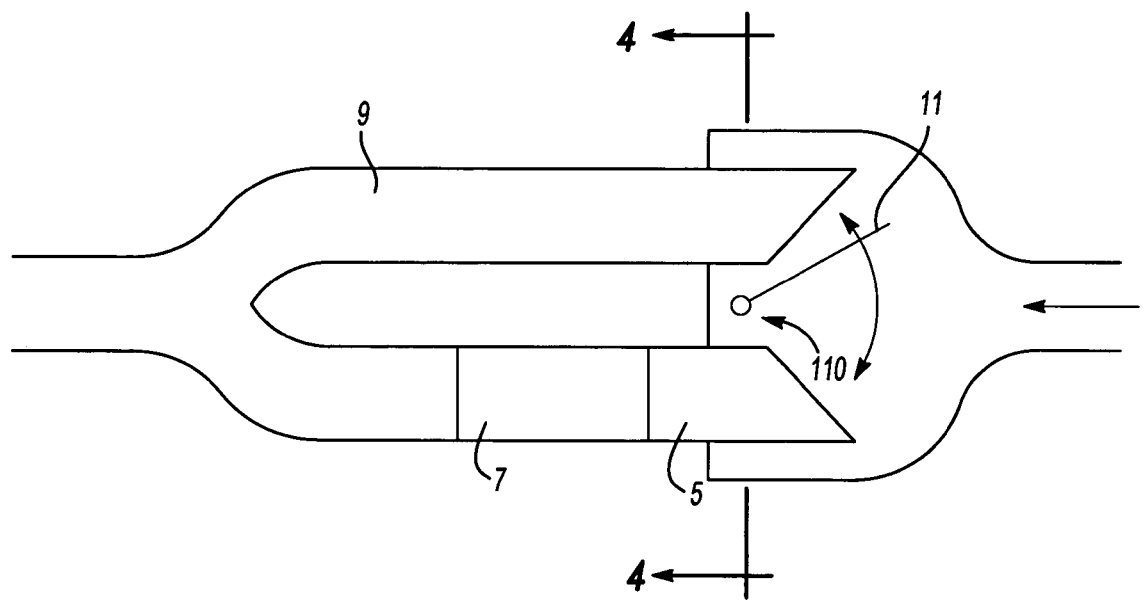
FIG. 2 schematically shows a second example of an exhaust gas heat exchanger system.

In the embodiment of FIG. 2, the gas flow is controlled directly, by a valve 110 such that the inlet opening of heat exchanger duct 5 or bypass duct 9 is opened or closed by a valve flap 11. Here again, intermediate positions of valve 11 allow for any desired portion of the gas flow to be achieved through the ducts 5 and 9.

Figure 3:
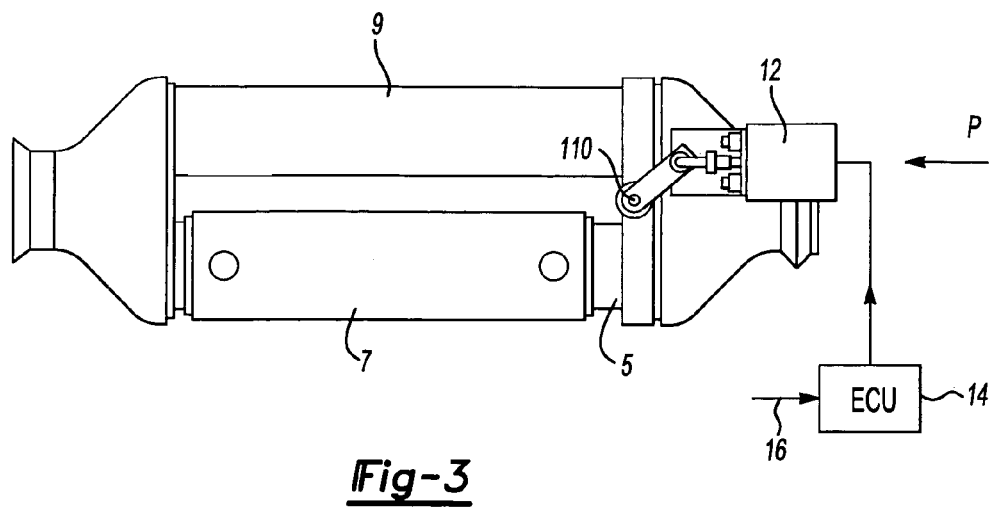
FIG. 3 shows a top view of the exhaust gas heat exchanger system of FIG. 2.

FIG. 3 shows in detail the heat exchanger unit of FIG. 2. Valve 110 is actuated by an actuator 12, which controls the valve 110 between three positions, namely a first position in which valve flap 11 closes bypass duct 9, an intermediate position approximately corresponding to the position shown in FIG. 2 and in which valve flap 11 allows some of the exhaust gas to flow through bypass duct 9, and a second position in which valve flap 11 closes heat exchanger duct 5.

Actuator 12 is controlled by a ECU 14. ECU 14 is here depicted as a separate component but could be incorporated into the control of a fuel injection system of the combustion engine. ECU 14 is provided with a signal 16, which represents the pressure drop across the heat exchanger system. This signal could be obtained by directly measuring the pressure drop. Preferably, this signal is an indirect indication of the pressure drop as the actual pressure drop depends in a known manner from other parameters which are already known with advanced injection systems. One example is to feed the ECU 14 the intake air mass flow and the amount of injected fuel. Based on these values, the exhaust gas mass flow can be calculated, which in turn allows for either the calculation of a pressure drop across the heat exchanger system or for the gathering of the pressure drop based on stored values. Another example is to feed the ECU 14 the engine speed, which also allows for the calculation of the exhaust gas mass flow. Other ways of indirectly determining the pressure drop across the heat exchanger 7 could be used as well. The valve 10 in FIG. 1 can be controlled in a similar manner.

Figure 4:
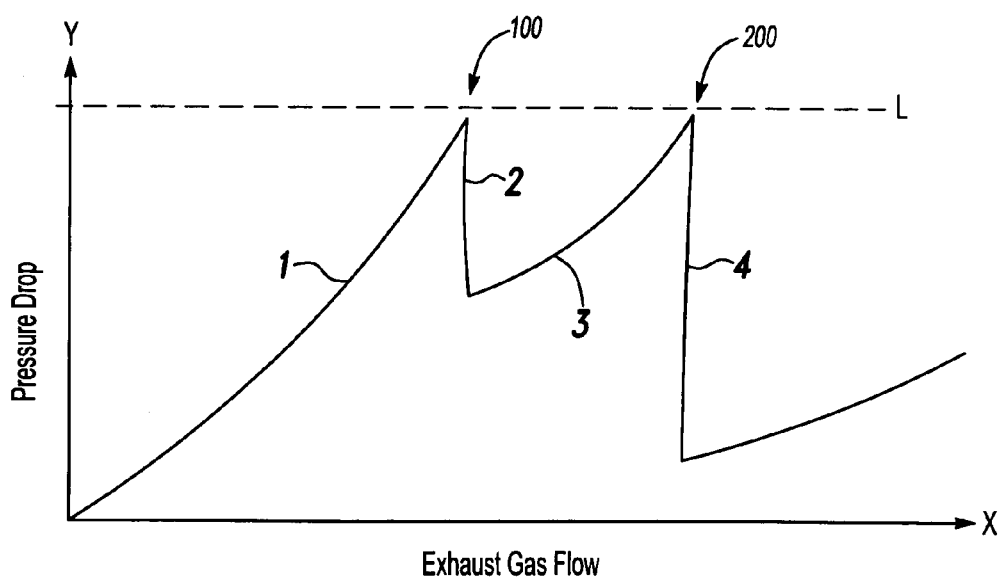
FIG. 4 shows a graph indicating an example pressure drop vs. gas mass flow achieved with the method according to the invention.

FIG. 4 shows a graph which explains the way the valve 110 is controlled between the first, the intermediate and the second position. In this graph, the x-axis generally corresponds speaking to the exhaust gas flow. The y-axis represents the pressure drop across the heat exchanger system and therefore generally corresponds to the back pressure of the exhaust system. Broken line L represents a limit of the pressure drop and is predefined in view of acceptable back pressure of the exhaust system.

Upon engine start, first, there is a determination whether or not the auxiliary heating system is required. Assuming that engine start is in cold weather conditions and additional heating performance is desirable, the valve 110 is switched to the first position in which the entire exhaust gas flows through heat exchanger duct 5 and thereby through heat exchanger 7. As can be seen in FIG. 4, the pressure drop and accordingly the back pressure increases with increasing flow through the exhaust system (section 1 of the curve). At a point indicated with 100, the ECU 14 determines that limit L of the pressure drop has been reached. Accordingly, the valve 110 is moved from the first position into an intermediate position in which a first portion of the exhaust gas continues to flow through the heat exchanger 7 while a remaining portion flows through bypass duct 9. This results in an increase of the available cross section offered to the exhaust gas and a corresponding decrease of the pressure drop (section 2 of the curve). The amount of exhaust gas traveling through the heat exchanger duct 5 is between 50% and 90% in disclosed embodiments.

It could be shown that just a small flow of exhaust gas through the bypass duct 9 is sufficient for significantly reducing the pressure drop across the heat exchanger system. For example, reducing the mass flow through the heat exchanger 7 by thirty percent (30%) may result in a decrease of the pressure drop by almost fifty percent (50%).

If the valve 110 assumes its intermediate position and the flow through the exhaust gas system is further increased, the pressure drop again rises (section 3 of the curve) and finally again reaches limit L (point 200). Then, the valve 110 is switched into a second position in which the valve 110 closes heat exchanger duct 5 and entirely opens bypass duct 9, resulting in the entire exhaust gas flowing through the bypass duct 9 (possibly apart from any small leakage flow). Accordingly, the pressure drop across the heat exchanger 7 significantly decreases (section 4 of the curve).

If thereafter the flow through the exhaust gas system is further increased, the back pressure again increases. However, no critical values are reached as the heat exchanger 7 no longer increases the flow resistance through the exhaust gas system.

If the gas mass flow through the heat exchanger system decreases while heat is still to be transferred from the exhaust gas to the heat exchanger 7, the valve 110 is switched back to its intermediate position or even to its first position.

The invention claimed is:

1. A method for controlling a valve in an exhaust gas heat exchanger system of a combustion engine, the exhaust gas heat exchanger system comprising a bypass duct and a heat exchanger duct with a heat exchanger, the method comprising the following steps:
   (A) determining that heat is to be transferred from an exhaust gas flowing through the exhaust gas heat exchanger system;
   (B) switching the valve into a first position wherein a first larger portion of the exhaust gas flows through the heat exchanger duct;
   (C) monitoring the pressure drop of the exhaust gas heat exchange system;
   (D) switching the valve into an intermediate position if the pressure drop reaches a first predefined limit, wherein switching the valve into the intermediate position causes a second smaller portion of the exhaust gas to flow through the heat exchanger duct and a remaining portion to flow through the bypass duct, thereby reducing the pressure drop of the exhaust gas heat exchanger system; and
   (E) switching the valve into a second position if the pressure drop reaches a second predefined limit, wherein switching the valve into the second position causes a third portion of the exhaust gas to flow through the heat exchanger duct, the third portion being smaller than the second smaller portion, thereby further reducing the pressure drop of the exhaust gas heat exchanger system.

2. The method of claim 1 wherein the pressure drop is directly sensed.

3. The method of claim 1 wherein the pressure drop is calculated based on data relating to the combustion engine.

4. The method of claim 3 wherein the pressure drop is calculated based on an engine speed.

5. The method of claim 3 wherein the pressure drop is calculated based on data from a fuel injection system of the combustion engine.

6. The method of claim 5 wherein the data from the fuel injection system comprises the intake air mass flow.

7. The method of claim 5 wherein the data from the fuel injection system comprises an amount of injected fuel.

8. The method of claim 1 wherein the first predefined limit and the second predefined limit are equal.

9. The method of claim 1 wherein the third portion is near 0% of an entire gas flow.

10. The method of claim 1, wherein the first larger portion is effectively 100% of an entire gas flow.

11. A method of controlling a valve in an exhaust gas heat exchanger system of a combustion engine, the exhaust gas heat exchanger system comprising a bypass duct and a heat exchanger duct with a heat exchanger, the method comprising the following steps:

(A) determining that heat is to be transferred from an exhaust gas flowing through the exhaust gas heat exchanger system;

(B) switching the valve into a first position wherein a first larger portion of the exhaust gas flows through the heat exchanger duct;

(C) monitoring the pressure drop of the exhaust gas heat exchange system; and (D) switching the valve into an intermediate position if the pressure drop reaches a first predefined limit, wherein switching the valve into the intermediate position causes a second smaller portion of the exhaust gas to flow through the heat exchanger duct and a remaining portion to flow through the bypass duct, thereby reducing the pressure drop of the exhaust gas heat exchanger system.

* * * * *